United States Patent [19]

Edwards

[11] Patent Number: 4,613,808
[45] Date of Patent: Sep. 23, 1986

[54] FAULT DETECTOR FOR AN ALTERNATOR

[75] Inventor: Arthur J. Edwards, Hoffman Estates, Ill.

[73] Assignee: Motorola, Inc., Schaumburg, Ill.

[21] Appl. No.: 700,218

[22] Filed: Feb. 11, 1985

[51] Int. Cl.$^4$ .............................................. H02J 7/14
[52] U.S. Cl. ...................................... 322/99; 322/29; 361/21
[58] Field of Search ....................... 322/99, 29; 361/20, 361/21

[56] References Cited

U.S. PATENT DOCUMENTS

| | | | |
|---|---|---|---|
| 4,164,705 | 8/1979 | Whitney et al. | 322/99 X |
| 4,242,674 | 12/1980 | Wheeler | 322/99 X |
| 4,316,134 | 2/1982 | Balan et al. | 322/99 |
| 4,379,990 | 4/1983 | Sievers et al. | 322/99 |

Primary Examiner—R. J. Hickey
Attorney, Agent, or Firm—John H. Moore

[57] ABSTRACT

An electronic circuit is disclosed for detecting a non-operating or fault condition in an alternator. The disclosed embodiment senses the alternator's unrectified output voltage and generates a control signal when the alternator's output voltage fails to exceed a threshold. That threshold is selected to be outside the range of any static voltage the alternator might generate as a result of leakage currents therein. Further circuitry preferably responds to the control signal by generating an indication of a non-operating condition in the alternator.

9 Claims, 5 Drawing Figures

FAULT DETECTOR FOR AN ALTERNATOR

FIELD OF THE INVENTION

This invention relates to the field of alternators and is particularly directed toward automotive alternators and techniques for indicating when a fault exists with such an alternator.

BACKGROUND OF THE INVENTION

Most automotive vehicles include an alternator and some method for alerting the vehicle operator to the fact that the alternator is or is not developing an output voltage as required. In many cases, a "check engine" light or the like is energized when a sensor indicates that the alternator is not rotating and, therefore, not developing the required output voltage.

A common method for indirectly sensing alternator rotation is to measure a so-called "phase tap" voltage on a connection to one of the alternator windings. By comparing the phase tap voltage to a reference, a determination can be made as to whether the measured voltage is indicative of a properly rotating alternator.

In some applications, the phase tap voltage is differentiated and otherwise processed so as to isolate the AC output of the alternator from DC voltages. An appropriate AC output is then interpreted as an indication of a properly rotating alternator. Although this technique is reliable and is very acceptable for some applications, AC signal processing is too expensive for certain other applications.

Another technique avoids the use of AC signal processing by directly sensing a positive output voltage from the alternator, comparing the sensed voltage to a reference, and actuating a fault indicator (such as the "check engine" light) when the magnitude of the sensed voltage is less than the reference. Thus, either a DC or an AC signal of sufficient magnitude at the alternator's phase tap will inhibit the fault indicator.

Although the DC type signal processing described above can provide acceptable results under nominal conditions, it is subject to error. Specifically, the rectifier diodes, which are normally part of every alternator, have leakage currents associated with them. If those leakage currents reach a sufficient magnitude, they can develop a voltage at the alternator's phase tap which is large enough to be interpreted as an indication of a properly rotating alternator, even when the alternator is stopped. This condition is discussed in more detail below, but it is sufficient here to say that this DC type signal processing can indicate that the alternator is working properly when, in fact, it is not even rotating.

OBJECTS OF THE INVENTION

It is a general object of the invention to provide an improved detector for determining whether an alternator is rotating properly.

It is a more specific object of the invention to provide such a detector which uses DC signal processing techniques but which is not subject to the problems discussed above.

SUMMARY OF THE INVENTION

Broadly stated, the invention provides a circuit which senses a non-operating condition (i.e., a non-rotating condition or a fault condition) in an alternator by means which sense the unrectified output from the alternator and which generate a control signal whenever the alternator's sensed output fails to exceed a threshold or reference voltage. That threshold is selected to be either above or below a range of static voltages which could be developed by leakage currents within the alternator. When the threshold is not exceeded for a certain time interval, further circuitry generates an indication of the alternator's non-operating condition.

DESCRIPTION OF THE PREFERRED EMBODIMENT

Figure 1:
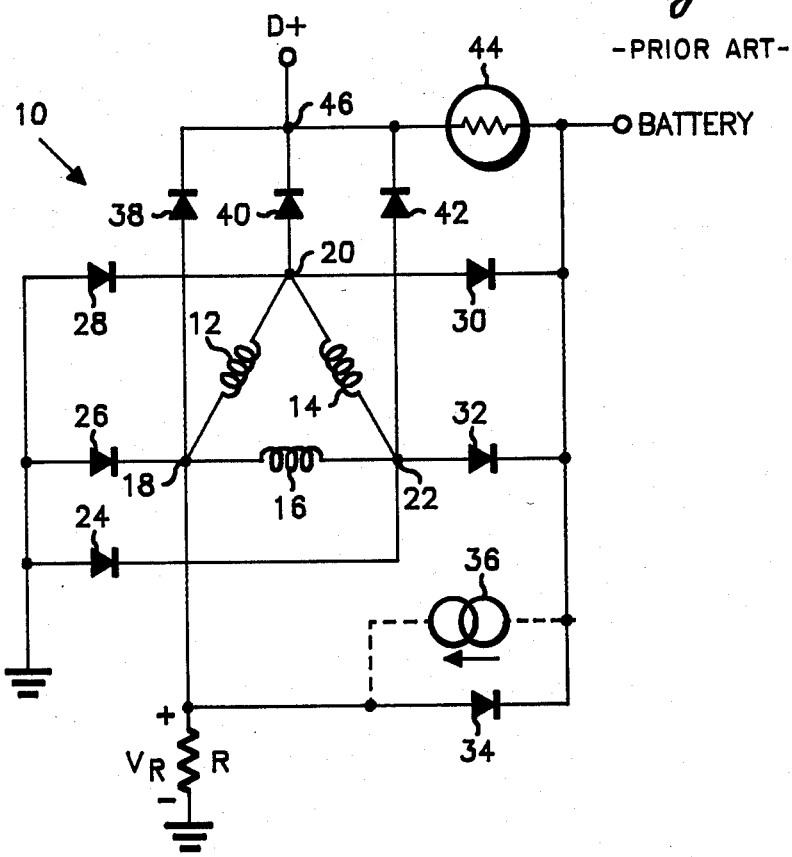
FIG. 1 is a schematic representation of a typical alternator whose operation is monitored in accordance with the invention.

Referring to FIG. 1, the reference numeral 10 generally designates a conventional alternator of the type commonly found in automotive vehicles. This depicted alternator is exemplary of the type of alternator whose operation may be monitored in accordance with the invention.

The illustrated alternator 10 includes delta-connected windings 12, 14, and 16 for developing an AC output voltage when the alternator rotates. Different phases of that output voltage appear at phase taps 18, 20, and 22. To rectify the alternator's output voltage, diodes 24, 26, 28, 30, 32, and 34 are conventionally connected to the phase taps as shown.

As discussed above, it is desirable to develop a reliable indication of a non-operating or faulty alternator by the use of DC signal processing techniques. One difficulty which has been mentioned is that the rectifier diodes are capable of developing leakage currents which develop voltages which can be mistaken for a valid output from an operating alternator. For example, the illustrated alternator 10 includes a resistor R which is coupled between ground and the phase tap 18 to absorb leakage currents from the rectifier diodes. In the case where the diode 34 has developed a leakage current, as depicted by the leakage current generator 36, a DC voltage will be developed across the resistor R in response to the leakage current.

The type and size of diodes used in automotive applications can give rise to a leakage current from a single diode which is in the tens of milliamperes. Further, leakage currents can be developed by all six rectifier diodes, and this condition becomes exaggerated by high temperature operation where leakage becomes much worse. As the resistor R has a value which is typically about 1 kilohm, the magnitude of the DC component of $V_R$ (the voltage across the resistor R) can be significant and can be misinterpreted as an indication that the alternator is rotating and operating properly. It is not practical to lower $V_R$ by reducing the value of R, as this would lead to excessive dissipation in R. Further, as R is sometimes part of a thick film assembly, the physical size of the resistor R would become too large.

In some applications, a D+ supply is used to generate a voltage which is sensed to detect proper generator operation. Such a system is indicated in FIG. 1 by the inclusion of diodes 38, 40 and 42 for developing the D+ voltage, and a lamp 44 that may be electrically connected between the vehicle's battery and the D+ supply. With this conventional arrangement, the lamp is normally energized to indicate a fault condition when the D+ supply is not being generated. However, even when the alternator is not rotating, sufficient voltage may be developed by diode leakage currents so that the potential at the D+ terminal (node 46) rises enough to prevent the energization of the lamp 44.

With the present invention, the effect of static DC voltages induced by diode leakage currents is avoided while yet developing a reliable indication of a non-operating alternator through the use of DC signal processing techniques. In one embodiment, this technique involves comparing the unrectified output of the alternator (as from the phase tap 18) to a threshold or reference voltage whose value is outside the range of the static DC voltage which can be developed at the alternator's phase tap in response to diode leakage currents. If the comparison reveals that the alternator voltage exceeds the threshold voltage, this is an indication that the alternator is delivering an AC output signal and must, therefore, be rotating.

Figure 2:
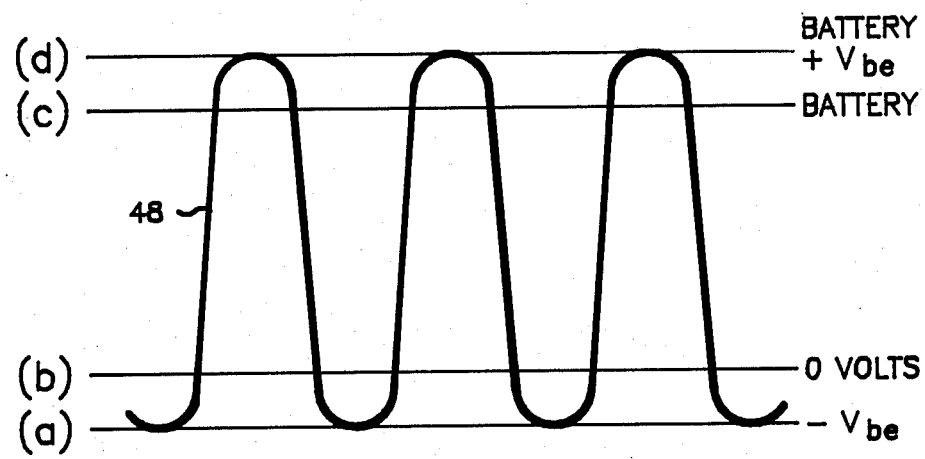
FIG. 2 depicts voltage ranges over which the alternator's output signal can vary.

To explain more fully, reference is made to FIG. 2 which illustrates that the AC signal 48 developed by the alternator extends from voltage level (a) to voltage level (d). In the case of the alternator shown in FIG. 1, the signal 48 appears at the phase tap 18, and the voltage level (d) corresponds to the battery voltage plus one diode drop (i.e., one $V_{be}$). The voltage level (a) corresponds to a negative voltage which is one diode drop below zero volts and level (b) in FIG. 2 corresponds to zero volts. Thus, when the alternator is rotating, its output voltage $V_R$ at the phase tap 18 can swing between levels (a) and (d). Under static conditions (the alternator is not rotating), the voltage $V_R$ will have only a DC component which can be anywhere between the levels (b) and (c), depending on the value of R and the amount of diode leakage current. To exclude the effects of the leakage currents in determining the status of the alternator, one embodiment disclosed herein compares the alternator's unrectified output voltage from the phase tap 18 to a reference or threshold voltage whose value is more negative than the static phase tap voltage. In terms of the symbols used in FIG. 2, this means that the reference voltage will be below level (b), since the static phase tap voltage can be anywhere between the levels (b) and (c). In practice, a reference voltage between zero volts (level (b)) and one diode drop below zero volts (level (a)) provides a suitable reference. Minus 0.2 volts has been found to provide good results. Of course, one could also use a reference voltage which is more positive than level (c), as between the levels (c) and (d).

Figure 3:
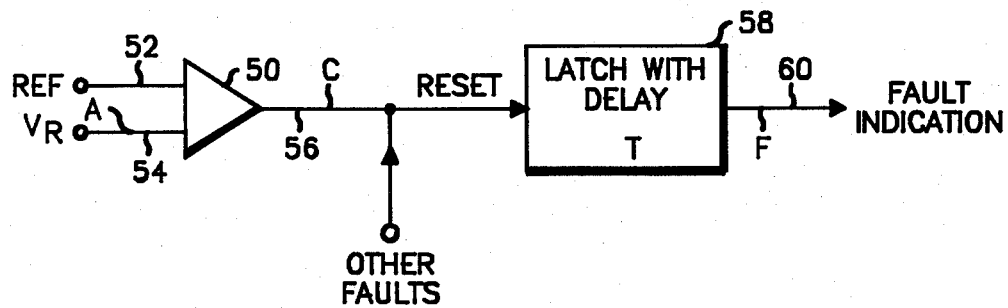
FIG. 3 depicts a circuit according to the invention for sensing the alternator's output and for generating an indication of a non-operating alternator.

Referring now to FIG. 3, a circuit which develops an indication of a non-operating alternator is shown as including a comparator 50 having a first input 52 for receiving a threshold or reference voltage (REF) and a second input 54 for receiving $V_R$, the voltage developed by the alternator 10 at the phase tap 18 (FIG. 1). The output of the comparator 50 is coupled via a line 56 to the reset input of a conventional latch 58. The latter device includes a time-out delay such that a latched output is developed on an output line 60 and held for a selected time T after the reset input has ended.

Figure 4:
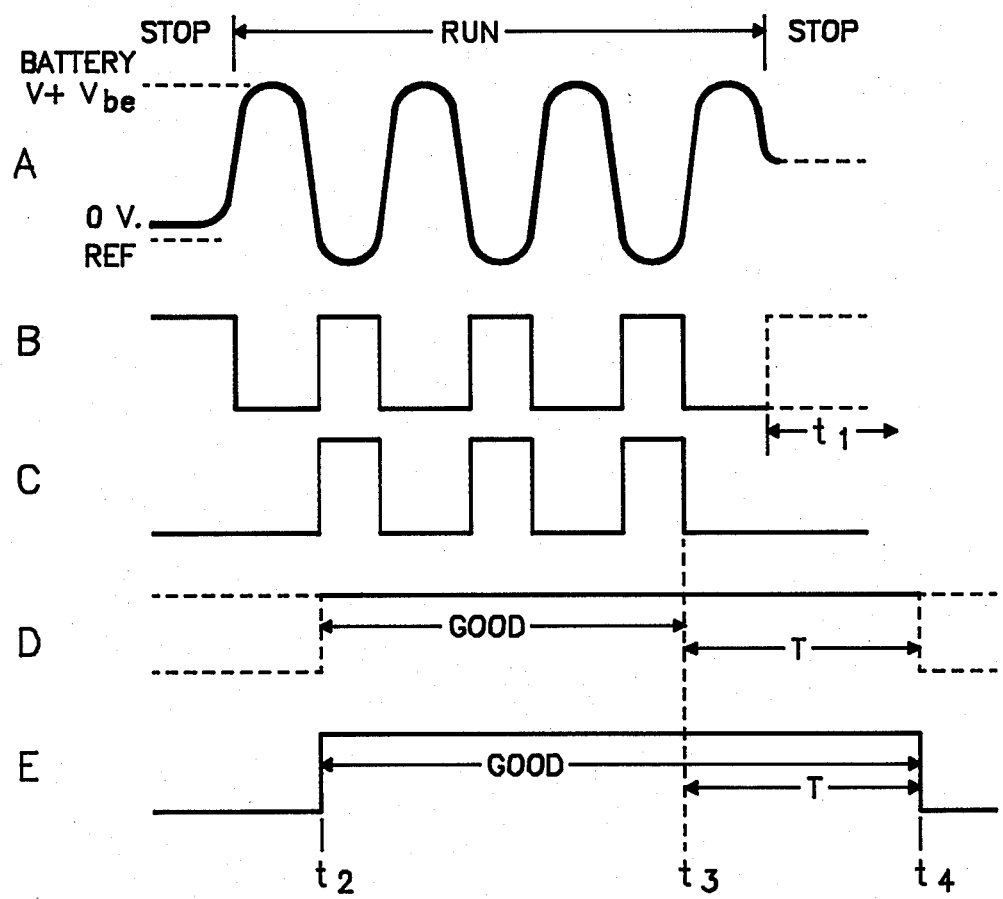
FIG. 4 illustrates various waveforms which are used to explain the operation of the circuit shown in FIG. 3.

In operation, assume that the signal $V_R$ applied to the comparator's input 54 is as shown in FIG. 4, waveform A, and that a reference voltage of minus 0.2 volts is applied to the input 52 of the comparator 50. Under those conditions the output of the comparator 50, as shown in waveform C, will go high each time the signal $V_R$ exceeds (goes more negative than) the reference voltage. When the signal $V_R$ goes positive with respect to the reference voltage, the comparator's output goes negative. The comparator's output also goes low and stays low while the alternator is stopped because, as indicated in waveform A, the alternator's phase tap voltage is static and does not extend beyond the reference level when the alternator is stopped.

It can be seen that, by selecting the reference voltage to be outside the range of the static phase tap voltage, an unambiguous, low output (waveform C) is developed by the comparator 50 whenever the alternator stops rotating or otherwise fails to develop a proper AC output voltage. That low output may be considered as a control signal to be used to develop an indication of a non-rotating or otherwise faulty alternator.

In contrast, consider the operation if the reference input to the comparator 50 were chosen to be between levels (b) (zero volts) and (c) (battery voltage) (FIG. 2). As illustrated by waveform B in FIG. 4, the output of the comparator 50 during interval $t_1$ could be either high or low after the alternator stops (and before it starts) because $V_R$ (waveform A) can stop anywhere between zero volts and battery voltage, depending on leakage currents. Stated differently, the static output of the alternator can vary between a level below a positive reference and a level above a positive reference, depending on the amount of diode leakage current. This ambiguity is removed by the circuitry shown in FIG. 3 when the reference voltage is selected to be outside the range of the alternator's static phase tap voltage.

Referring again to FIG. 3, and again assuming that the same negative reference voltage is applied to the comparator, the line 56 will carry the comparator's output (waveform C) to the reset input of the latch 58. Upon receipt of the first positive-going edge of waveform C (time $t_2$) the output of the latch 58 (waveform E) goes high. Due to the delay T built into the latch 58 (as under the control of an oscillator and counter system or an RC time constant), its output will go low only after the waveform C has remained low for an interval T. Consequently, the output of the latch stays high as long as the alternator is running (from $t_2$ to $t_3$), and then continues high for a further interval T because of the delay associated with the latch. At time 4, the output of the latch drops to a low level.

The reason for including the delay T in the operation of the latch 50 is to ensure that the output of the latch does not change levels in response to a short transient fault. This, of course, assumes that the interval T is longer than the period of waveform C.

To again compare the results of the present circuit and technique to the results obtained by applying a positive reference voltage (between levels (b) and (c) in FIG. 2) to the comparator 50, recall that the use of such a positive reference voltage results in waveform B (FIG. 4) as an output from the comparator. When the latch 50 receives waveform B, the latch's output is as indicated in waveform D. Note that prior to $t_2$ waveform D may be high or low, depending on the level of waveform B which, in turn, depends on the static output from the alternator. Also, after time $t_4$ waveform D may be high or low, depending on the level of waveform B which again depends on the level of the static output of the alternator. As the level of the alternator's static output depends on the amount of diode leakage current, it can be seen that the output of the latch 50 (waveform D) can vary in accordance with diode leakage current unless the comparator's reference voltage is selected properly.

Figure 5:
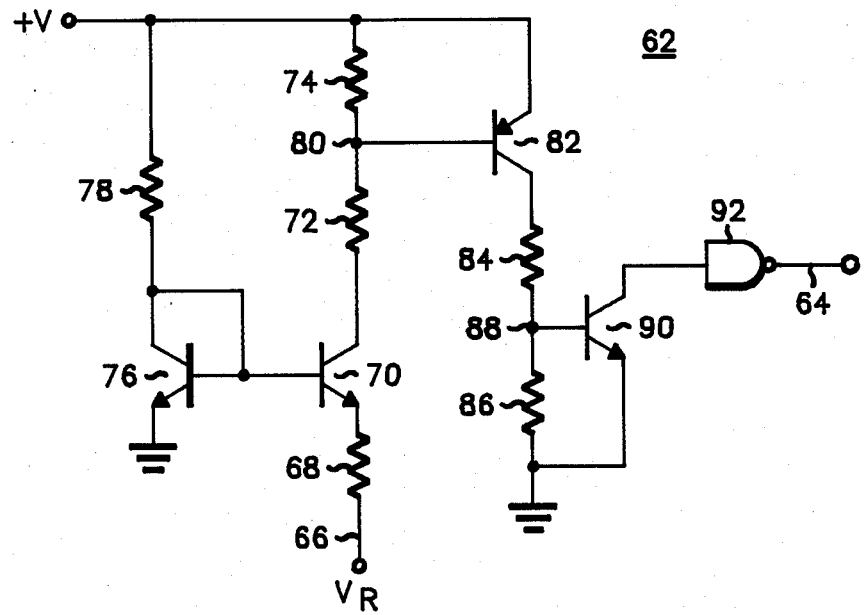
FIG. 5 is an electrical circuit which is an alternate to the comparator shown in FIG. 3.

Referring now to FIG. 5, a circuit 62 is shown which may be used in place of the comparator 50. This circuit 62 is designed to develop, at an output line 64, a signal as shown in waveform C (FIG. 3) in response to the alternator's unrectified output (waveform A of FIG. 4) being applied to an input line 66. This result is obtained without the use of a negative reference voltage.

As shown, the circuit 62 couples the line 66 through a resistor 68 to the emitter of an NPN transistor 70. The collector of transistor 70 is coupled via resistors 72 and 74 to a supply voltage $+V$. Another transistor 76 has its base connected to the base of the transistor 70 and to its own collector, with a resistor 78 coupling its collector to the $+V$ supply. With this arrangement, the resistor 78 may be selected to cause a current of about 100 microamperes to flow in the transistor 76.

The junction between the resistors 72 and 74 (node 80) is connected to the base of a PNP transistor 82 whose emitter is coupled to the $+V$ supply. The collector of this transistor is coupled to ground through resistors 84 and 86. The junction (node 88) between resistors 84 and 86 is connected directly to the base of a grounded-emitter transistor 90 whose collector drives an inverter 92 which developes the output of this circuit.

With the illustrated arrangement, it is clear that the transistor 70 becomes conductive only when the input signal on line 66 goes sufficiently negative. When that occurs, the node 80 also goes negative to turn on the transistor 82. To effectuate this operation, the resistor 68 may be selected such that the peak negative voltage of the input signal, divided by the resistance of resistor 68, equals 100 microamperes. Also, the value of the resistor 74 may be selected to turn on the transistor 82 when the collector current of the transistor 70 equals 100 microamperes.

When the transistor 82 is turned on, its collector current drives the voltage at the node 88 positive, thereby turning on the transistor 90. The resultant collector current in the transistor 90 causes the inverter 92 to develop an output as indicated by waveform C (FIG. 4). That output may be applied to a latch circuit as indicated in FIG. 3 for developing a further output of the type shown by waveform E (FIG. 4). The signal depicted by waveform E may then be processed such that the low levels of waveform E constitute an indication of a fault condition in the alternator. For example, the signal represented by waveform E may be used to drive, directly or indirectly, a lamp or other device which signals the vehicle operator that an alternator fault exists (or that the alternator is not rotating) whenever the waveform E is at a low level.

An advantage of the circuit shown in FIG. 5 is that it does not require a reference voltage input. However, it does include an internally developed threshold beyond which the alternator's output signal must extend before the transistor 82 is activated. This threshold is negative and is substantially equal to the base-emitter voltage drop of transistor 82 times the ratio of resistor 74 to resistor 68.

As will be appreciated from the foregoing description, the invention provides an improved detector which uses DC signal processing techniques to determine whether an alternator is rotating properly. Ambiguities and errors associated with leakage currents from the alternator's diodes are avoided by sensing alternator output signals which extend beyond the alternator's static phase tap voltage.

Although the invention has been described in terms of a preferred embodiment, it will be obvious to those skilled in the art that many alterations and modifications may be made without departing from the invention. Accordingly, it is intended that all such modifications and alterations be considered as within the spirit and scope of the invention as defined by the appended claims.

What is claimed is:

1. In a system for charging a battery from an alternator capable of developing a static voltage due to leakage current in the alternator, a circuit for sensing a non-operating alternator, comprising:
   first means for establishing a threshold selected to be outside the range of the alternator's static voltage, and being coupled to the alternator for sensing the unrectified output thereof and for generating a control signal whenever the alternator's sensed output does not exceed said threshold; and
   second means responsive to the control signal for generating an indication of a non-operating condition in the alternator.

2. A circuit as set forth in claim 1 wherein said threshold is a threshold signal whose value is outside the range between zero volts and battery voltage and wherein said first means includes means for comparing the alternator's output to the threshold signal.

3. A circuit as set forth in claim 2 wherein said threshold signal is selected to be negative with respect to zero volts.

4. A circuit as set forth in claim 3 wherein the threshold signal is selected to be less than one diode drop below zero volts.

5. A circuit as set forth in claim 2 wherein the alternator includes at least one phase tap and wherein said means for sensing the output of the alternator is coupled to said phase tap for sensing the voltage thereat.

6. A circuit as set forth in claim 1 wherein said means for generating an indication of a non-operating condition causes such an indication to occur only after the control signal has continued for a selected time interval.

7. In a system for charging a battery from an alternator capable of developing a static voltage due to leakage current in the alternator, a circuit for sensing a non-operating alternator, comprising:
   means providing a threshold voltage whose value is more negative than the static voltage of the alternator;
   a comparator receiving as one input thereto the unrectified signal developed by the alternator, and receiving as another input thereto said threshold voltage, the comparator being selected to develop a control signal when the threshold voltage is more negative than the alternator input to the comparator; and
   means responsive to the continuance of the control signal for indicating that the alternator is in a non-operating condition.

8. A circuit as set forth in claim 7 wherein the alternator includes a plurality of phase taps, and wherein said one input of the comparator is coupled to one of the phase taps.

9. In a system for charging a battery from an alternator which includes a plurality of phase taps and a plurality of diodes capable of developing leakage currents which result in static voltages at the phase taps, a circuit for sensing a non-operating alternator, comprising:

means providing a threshold voltage whose value is more negative than the static voltage at a selected phase tap;

means coupled to the alternator for sensing the unrectified output thereof at the selected phase tap, for comparing said output to the threshold voltage, and for generating a control signal whenever the threshold voltage is more negative than the sensed alternator output; and means responsive to the control signal for generating an indication of a non-operating alternator.

* * * * *